United States Patent [19]

Smith et al.

[11] 4,141,651
[45] Feb. 27, 1979

[54] LASER GYROSCOPE OUTPUT OPTICS STRUCTURE

[75] Inventors: Irl W. Smith, Newton; Terry A. Dorschner, Waltham, both of Mass.

[73] Assignee: Raytheon Company, Lexington, Mass.

[21] Appl. No.: 758,223

[22] Filed: Jan. 10, 1977

[51] Int. Cl.² ............................ G01B 9/02; G01P 9/00
[52] U.S. Cl. .................................................. 356/350
[58] Field of Search .................................. 356/106 LR

[56] References Cited

U.S. PATENT DOCUMENTS

| | | | |
|---|---|---|---|
| 3,382,760 | 5/1968 | Macek | 356/106 LR |
| 3,390,606 | 7/1968 | Podgorski | 356/106 LR |
| 4,006,989 | 2/1977 | Andringe | 356/106 LR |

Primary Examiner—Vincent P. McGraw

Attorney, Agent, or Firm—M. D. Bartlett; J. D. Pannone; H. W. Arnold

[57] ABSTRACT

A four frequency laser gyroscope system having a rugged and compact output structure for producing output signals representing the frequency differences between counter-circulating wave pairs circulating as two beams within the gyroscope cavity. A partially transmitting dielectric mirror forms both one of the cavity reflectors and the means for extracting a small portion of each beam. The two extracted beams are combined on a beam splitter. Both the transmitted and reflected beams from the output of the beam splitter, each containing waves of all four frequencies, are utilized. Each resultant beam is then polarization discriminated to extract the desired signal content. The entire structure is adapted for rigid mechanical coupling and may be constructed to have a small size.

17 Claims, 5 Drawing Figures

LASER GYROSCOPE OUTPUT OPTICS STRUCTURE

BACKGROUND OF THE INVENTION

1. Field of the Invention.

The invention relates to laser gyroscopes and particularly to laser gyroscopes which employ waves of four different frequencies within the laser gyroscope cavity. More particularly, the invention relates to output optical structures used for extracting a portion of the beam circulating within the cavity and producing therefrom output signals representing the difference in frequency between beam pairs having the same polarization within the cavity.

2. Description of the Prior Art.

In general, laser gyroscopes are devices which have two or more waves circulating in opposite directions through a laser medium so that rotation of the system will cause the round-trip time for oppositely rotating waves to differ depending upon the rate and amount of rotation. With a two-wave system, it has been found that for low rates of rotation corresponding to a small theoretical difference frequency the actual output difference frequency is zero or substantially less than would be expected due to the phenomena known as lock-in. It is believed that the lock-in problem arises because of coupling between waves which may arise from a number of possible factors including back scattering of wave energy from elements within the path such as mirrors or a Faraday rotator or from scattering centers within the laser medium itself.

The earliest attempts to compensate for this problem included one proposal in which the two beams are biased at zero rotation away from the zero output level by the use of a Faraday rotator which subjects beams propagating in different directions to different delay times. Unfortunately, simply biasing the two beams sufficiently far apart to avoid lock-in produced a large frequency difference between the two beams, so large in fact that the change in frequency caused by ordinary amounts of rotation was rather insignificant compared to the total frequency. Thus, any small drift could obliterate the actual desired signal output. Further attempts to achieve biasing included one in which the Faraday rotator was switched from one direction to another using a symmetric AC switching waveform. Such systems have proven somewhat difficult to implement since the symmetry of the AC switching waveform must be maintained to greater than one part in a million.

One of the most successful laser gyroscopes yet proposed and constructed employs four waves of two pairs each propagating in opposite directions. Such systems are shown and described in U.S. Pat. Nos. 3,741,657 and 3,854,819 to Keimpe Andringa and assigned to the present assignee, the specifications of those patents being herein incorporated by reference. In such laser systems, circular polarization for each of the four waves is used. The pair of waves, or beam, propagating in the clockwise direction includes both left and right-hand circularly polarized waves as does that propagating in the counterclockwise direction.

Two biasing components are provided. A device such as a crystal rotator produces a delay for circularly polarized waves that is different for one sense or handedness of circular polarization than for the opposite sense and is also reciprocal. That is, a wave of given polarization traveling in either direction through the crystal will be delayed by the same amount of time. Secondly, a device such as a Faraday rotator is also disposed in the wave path. Such a device is nonreciprocal, providing, for a wave of either polarization sense, a different time delay for the two directions of propagation therethrough.

In any of these laser gyroscope systems, it is necessary to extract a portion of each beam circulating within the laser cavity to produce two output signals each one of which represents the difference in frequency between wave pairs having the same sense of circular polarization within the cavity. In order to accomplish this purpose, it is desirable at some point within the output structure to combine these two beams in such a manner as to produce two new beams, each including waves having the same sense of polarization.

Previously known output structures for separating, combining, and detecting the output signals were both mechanically bulky and wasteful of signal energy and did not fully separate the polarization states resulting in crosstalk at the detector output. Because of the waste of signal energy within the output structure, larger proportions of output energy had to be extracted from the cavity requiring higher gain from the laser gain medium. The mechanical awkwardness of the structures made such systems difficult to use in many applications. Moreover, because the various components within the output optical structure were not within direct physical contact with one another, misalignment problems between the various components often arose as did drift problems. Also in many structures it was not possible to use two diodes upon a single chip for the output detectors so that the characteristics of the diodes will be nearly identical.

Accordingly, it is an object of the present invention to provide a laser gyroscope system having a mechanically rugged, compact, and efficient output structure.

It is further an object of the present invention to provide such a system in which all the components of the output structure may be directly mechanically coupled to eliminate misalignment and accompanying drift problems.

Moreover, it is an object of the present invention to provide such an output structure in which the available output signal energy is maximally utilized.

Further, it is an object of the present invention to provide a structure capable of separating completely the waves having inside the cavity the same polarization sense from the other pair of waves, thereby eliminating crosstalk between the two signal outputs of the detectors thereby resulting in a more stable and noise-free signal.

Also, it is an object of the present invention to provide an output optic structure in which two diodes on a single chip may be employed.

SUMMARY OF THE INVENTION

These, as well as other objects of the invention, may be met by providing the combination of a laser gyroscope cavity including a laser gain medium, a polarization dispersive structure for producing waves of at least four frequencies, a plurality of reflecting means which form a loop or closed path for the waves with at least one of the reflecting means being partially transmissive of the waves incident thereon, a beam splitter, and means for directing the portions of the waves transmitted through the partially transmitting reflecting means to a common position upon the beam splitter whereon the beam splitter produces both transmitted and reflected beams. As used herein, the term "wave" applies only to a single electromagnetic wave propagating in one direction whereas the term "beam" refers to two or more such waves propagating along the same path in the same direction. The combination may also include means for converting the circularly polarized waves within the output structure to linear polarization disposed in the path of the reflected and transmitting waves from the beam splitter, polarizing means disposed in the path of the waves converted to linear polarization as they emerge from the polarization converting means, and detecting means which receives the waves as they emerge from the polarizing means. Preferably, the waves are four in number with two of the waves in the cavity circularly polarized with a first sense of polarization and two of the waves within the cavity circularly polarized with a second sense of polarization. A first one of the waves having the first sense of polarization and a first one of the waves having the second sense of polarization circulate around the path in a first direction, the other one of the waves having the same sense of polarization and the other one of the waves having the second sense of polarization circulating around the closed path in the opposite direction. In preferred embodiments, the partially transmitting reflecting means, the beam splitter, the directing means, and the converting means are mechanically coupled and mounted as a rigid unit. The detecting means and the polarizing means may further be included as part of the unit. The partially transmitting reflecting means may be a multilayer dielectric mirror including a transmitting substrate. The converting means is preferably a quarter-wave plate whereas the directing means is preferably a retro prism.

The invention may also be practiced by the combination of a laser gyro cavity including a laser gain medium, a polarization dispersive structure for producing waves of at least four frequencies, a plurality of reflectors positioned so as to form a loop or closed path in which propagate the waves, a transmitting substrate, a plurality of layers of dielectric material upon a first surface of the substrate forming one of the reflecting means for the waves within the cavity, a beam splitter disposed upon a portion of the second surface of the substrate at a position from which emerges a first beam from the transmitting substrate, a quarter-wave plate disposed over the beam splitter, a prism having a first surface adjacent the quarter-wave plate and having first and second surfaces at least portions of which are reflecting opposite the first surface and inclined at an angle thereto, first and second polarizers disposed adjacent a fourth non-reflecting surface of the prism, and first and second detectors positioned adjacent the first and second polarizers. The first beam emerging from the substrate strikes the beam splitter at a predetermined position and a second beam emerging from the substrate passes through the quarter-wave plate without touching the beam splitter and is reflected from both the reflecting surfaces of the prism back to the same position upon the beam splitter as was struck by the first beam. Transmitted and reflected waves are produced thereby each containing waves of all four frequencies. A first transmitted wave and a first reflected wave from the same position on the beam splitter pass through the substrate and are reflected from the rear side of the plurality of layers of dielectric material again through the substrate to the quarter-wave plate and are finally reflected from one of the reflecting surfaces of the prism to the first polarizer and first detector. The first polarizer is oriented so as to pass only the preferred two of the four waves contained in the beam at that point. A second transmitted and a second reflected wave from the position on the beam splitter are reflected from the same one of the reflecting surfaces of the prism to the second polarizer and second detector. The second polarizer is oriented so as to couple the other two waves to the second detector. In preferred embodiments, the layers of dielectric material, the substrate, the beam splitter, the quarter-wave plate, and the prism are mechanically interconnected so as to form a rigid structure. Further there may be provided second and third quarter-wave plates with the second quarter-wave plate being disposed between the prism and the first polarizer and the third quarter-wave plate being disposed between the prism and the second polarizer. Provision of the second and third quarter-wave plates has the additional advantage of reducing interference or crosstalk in the beams caused by depolarization at the surface of the dielectric layers.

DESCRIPTION OF THE PREFERRED EMBODIMENTS

Figure 1:
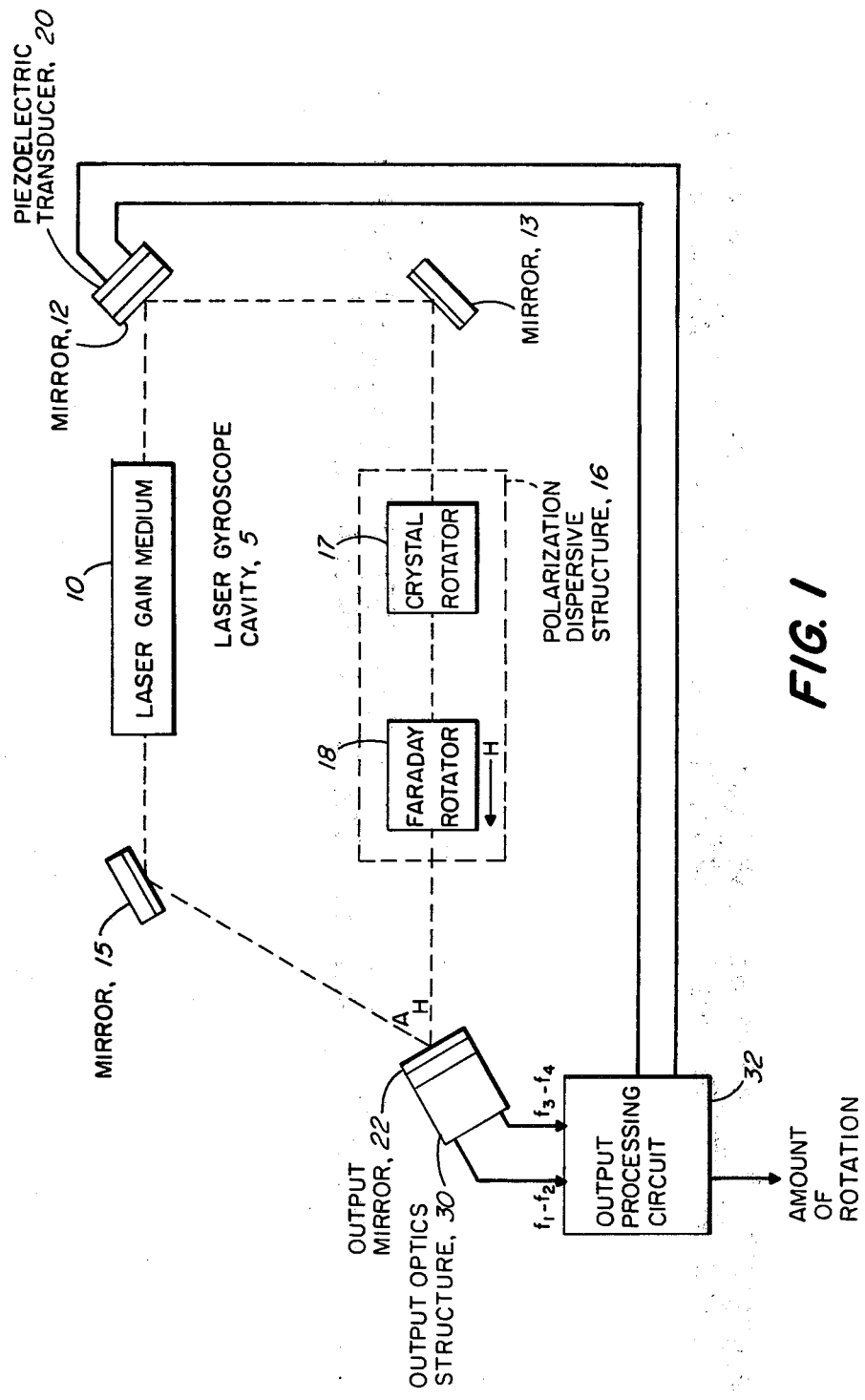
FIG. 1 is a block diagram of a laser gyroscope system in which the present invention is used to advantage.

Referring first to FIG. 1 there is shown a block diagram of a laser gyroscope system in which the present invention is used to advantage. Laser gyroscope cavity 5 operates in the manner described above in the incorporated patent specification and in the manner described above in the background of the invention. Laser gyro cavity 5 includes a closed or re-entrant path along which the four electromagnetic laser waves may propagate. The path includes laser gain medium 10, mirrors 12 and 13, polarization dispersive structure 16 including crystal rotator 17 and Faraday rotator 18, mirror 15, and output mirror 22. Because of the biases produced by crystal rotator 17 and Faraday rotator 18 there are four electromagnetic waves of frequencies f1–4 propagating within the closed path. Waves of frequencies of f1 and f4 circulate in the clockwise direction forming one beam within cavity 5 while waves of frequencies f2 and f3 circulate in the counterclockwise direction forming a second beam. All four waves are preferably circularly polarized with frequencies f1 and f2 being circularly polarized with one sense and waves of frequencies f3 and f4 being circularly polarized with the opposite sense. The positions upon the gain curve for laser gain medium 10 are shown in the diagram below of FIG. 2.

The output signal from the system is desired to be a digital number or other signal representing the total amount of rotation experienced by laser gyroscope cavity 5 commencing from a predetermined time period or, alternately, a digital number or other signal representing the present rate of rotation of laser gyroscope cavity 5. The rate of rotation is computed in accordance with the formula:

$$\Omega = L\lambda/8A\ [(f_4-f_3)-(f_2-f_1)]$$

where $\Omega$ is the rate of rotation about the sensitive axis of the gyro, L is the total path length, A is the effective area enclosed within the path, and $\lambda$ is the wavelength of the waves propagating within laser gyroscope cavity 5. The amount of rotation is found by integrating the above equation with respect to time.

In order to produce the signal representing the amount of rotation it is first necessary to derive signals representing the difference in frequency between the cavity waves of one circular polarization and the difference in frequency in the other circular polarization by $f_4-f_3$ and $f_2-f_1$ respectively. It is a function of the output optics structure 30 to combine the beams of frequencies $f_1$ and $f_2$ on one detector diode and $f_3$ and $f_4$ on a second detector diode without the presence of the two other waves upon either diode. Output processing circuitry 32 converts the signals representing the differences between the right and left-hand circularly polarized signals to a digital number representing the amount of rotation in accordance with the equation above. Output processing circuit 32 also operates upon the amplitudes of the signals derived from the two output diodes and produces therefrom an analog signal for operating piezoelectric transducer 20 to maintain the appropriate total path length within laser gyroscope cavity 5 such that the gain accorded to wave pairs is substantially equal. The operation of output processing circuit 32 and piezoelectric transducer 20 are described in copending U.S. patent application No. 756,672 filed on Jan. 4, 1977, of Alfred A. Zampiello and Bradley B. Patch, Jr., assigned to the present assignee.

Figure 2:
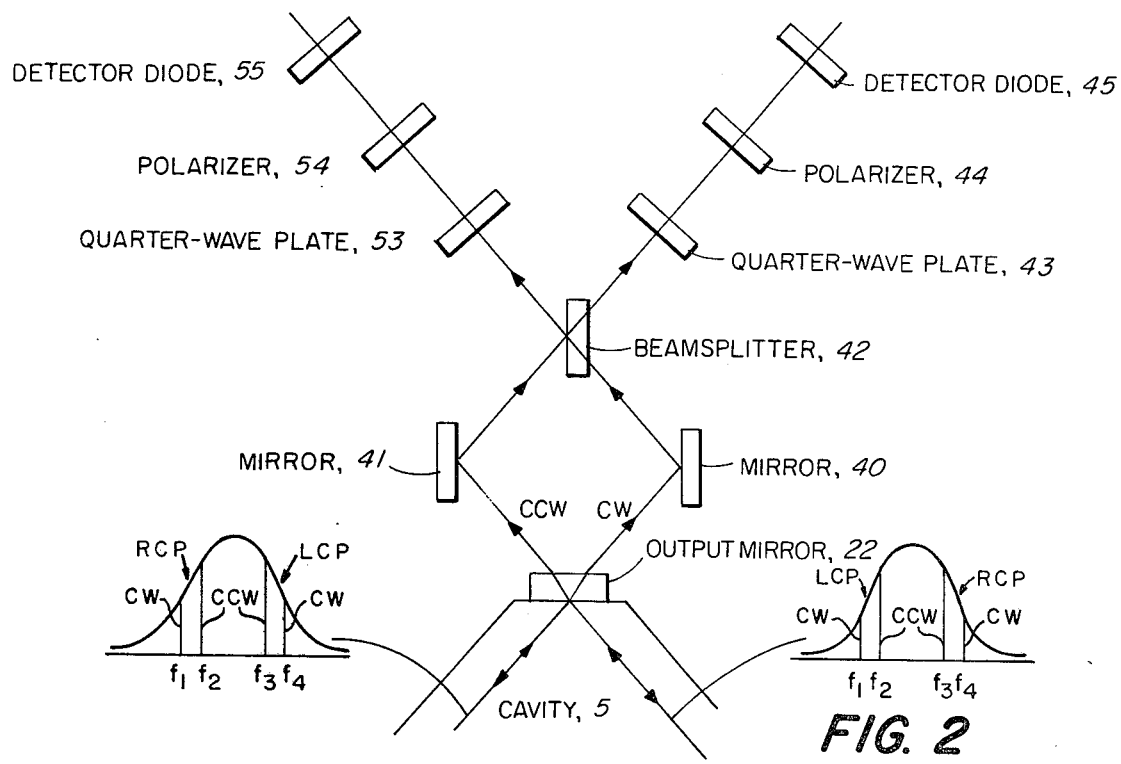
FIG. 2 is a diagram of an output structure in accordance with the invention with separately mounted optical components.

Referring next to the view of FIG. 2 there is shown schematically an output optics structure embodying the present invention. Output mirror 22 forms one of the reflectors defining the closed path within laser gyroscope cavity 5. Output mirror 22 is mostly reflecting, reflecting preferably 99% or more of the two beams incident thereupon. However, a small proportion of each output beam is transmitted through output mirror 22 emerging from the rear side thereof in the direction of mirrors 40 and 41.

For the discussion which immediately follows we will consider the case that the transmission of a circularly polarized wave through the output mirror 22 does not substantially alter its polarization state. The transmitted counterclockwise beam labeled CCW contains, for example, frequencies $f_2$ and $f_3$ of left and right-hand circular polarizations respectively. As indicated in the two small diagrams in FIG. 2, the polarization sense of each wave is opposite in successive legs of the cavity path due to the well-known change in handedness upon reflection. Thus, the clockwise beam labeled CW then contains waves of frequencies $f_1$ and $f_4$ of right-hand and left-hand circular polarization respectively. The clockwise beam is reflected from mirror 40 to a predetermined position on beam splitter 42. The counterclockwise beam is similarly reflected by mirror 41 to the same position upon beam splitter 42. Each beam shone upon beam splitter 42 produces both transmitted and reflective components, preferably of approximately equal magnitudes. The beam splitter is angularly aligned so as to colinearly combine beam transmitted through and reflected from the beam-splitting surface. Hence, the combined beams transmitted and reflected from beam splitter 42 each contain waves of all four frequencies. The transmitted portion of the clockwise beam and the reflected portion of the counterclockwise beam propagate along the same path to quarter-wave plate 53. Similarly, the transmitted portion of the counterclockwise beam and the reflected portion of the clockwise beam propagate together along the same path to quarter-wave plate 43. Thus, between beam splitter 42 and quarter-wave plates 43 and 53 the right and left-hand circularly polarized frequency pairs have been combined and are traveling together in the same directions along the same paths. For example, before quarter-wave plate 53, there are present waves of frequencies $f_1$ and $f_2$ with left-hand circular polarization and of $f_3$ and $f_4$ with right hand circular polarization. The same frequency waves will be present between beam splitter 42 and quarter-wave plate 43 with the opposite sense or handeness of circular polarization.

Quarter-wave plates 43 and 53 are oriented so that, for example, left-hand circular polarization is converted to vertical polarization and right-hand circular polarization is converted to horizontal polarization. Polarizers 44 and 54 are provided which pass only linear polarization. These are oriented orthogonal to each other so that, for example, polarizer 44 passes only horizontal polarization and polarizer 54 passes only vertical polarization. With this arrangement, the beams between polarizer 54 and detector diode 55 will consist only of frequencies $f_1$ and $f_2$ with linear vertical polarization and the beams between polarizer 44 and detector diode 45 will consist only of frequencies $f_3$ and $f_4$ with horizontal polarization. It is readily apparent that waves of only two frequencies strike each detector diode with waves of the other two frequencies completely eliminated.

It is a distinct advantage with the present invention that both transmitted and reflected beams from the combining beam splitter are utilized to form final output beams. In prior art output optics devices, only one of the two output beams from the beam splitter was utilized. Thus, utilizing the present invention, a waste of half the output power is eliminated. Only half the power as before need be extracted from the laser gyro cavity thereby in turn reducing the gain required from the laser amplifier and laser gain medium.

Figure 3:
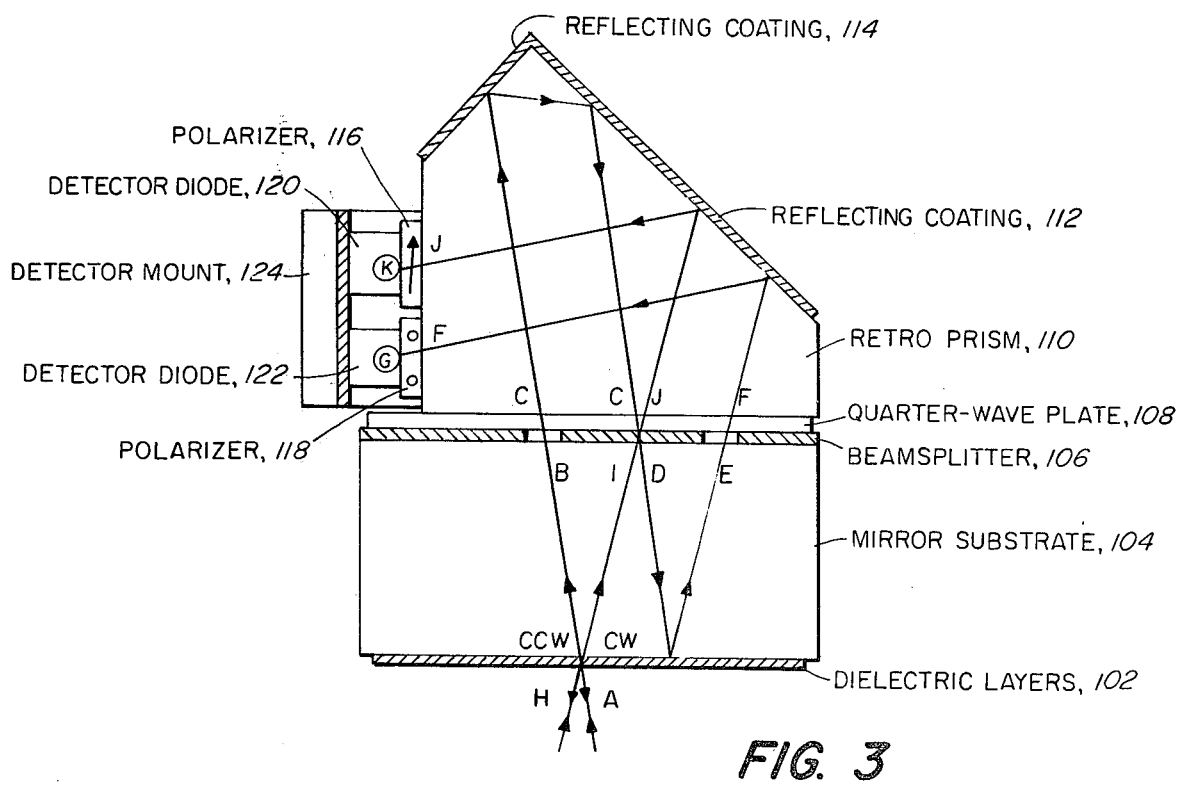
FIG. 3 shows a cross-sectional view of an output structure in accordance with the invention in which all output components are coupled in a mechanically rigid structure.

Referring next to FIG. 3 there is shown an embodiment of the invention in which all the output optical components are mechanically interconnected in a mechanically rigid and compact structure. In this embodiment, a mirror substrate 104 which may be of clear transmitting glass, is coated on one smooth surface thereof which a plurality of layers of dielectric material 102 to form a mostly reflecting mirror. This mirror forms one of the reflecting elements which define the closed path of laser gyro cavity 5. The number and construction of dielectric layers 102 are chosen so that a small portion of the beams incident thereon are transmitted into mirror substrate 104. Typically, ½% of the energy within the incident beams is transmitted into mirror substrate 104.

Beam splitter 106, also formed of dielectrical material, is positioned next to the opposite parallel surface of mirror substrate 104 from the plurality of dielectric layers 102. Apertures are provided within beam splitter 106 so that beams may pass therethrough as indicated in the diagram. In practice, beam splitter 106 may be formed by depositing dielectric material on the surface of quarter-wave plate 108 and subsequently etching an annulus, for example by using ion beam etching techniques, to form the required apertures. By providing the apertures within beam splitter 106 in the form of an annulus, the structure consisting of quarter-wave plate 108 and beam splitter 106 may be rotated to give the proper interaction between quarter-wave plate 108 and the beam incident thereupon so that for example beams of left-hand circular polarization will be converted entirely to vertical linear polarization and beams of right-hand circular polarization will be converted entirely to linear horizontal polarization.

Positioned adjacent to the upper surface of quarter-wave plate 106 is the lower face of retro prism 110. Retro prism 110 is preferably constructed of highly transmitting glass. Opposite the surface of retro prism 110 in contact with quarter-wave plate 108 are two additional surfaces of retro prism 110 to provide the beam reflective angles shown in the diagram. These surfaces are provided with reflecting coatings 112 and 114 which may either be a plurality of dielectric layers or a metallized coating.

Adjacent a fourth surface of retro prism 110 shown in the left-hand side of FIG. 3 are located polarizers 116 and 118. Detector diodes 120 and 122 are positioned opposite polarizers 116 and 118 so as to receive the linearly polarized waves transmitted by the polarizers. Polarizers 116 and 118 are, as before, oriented orthogonal to one another. Diode mount 124 secures detector diodes 120 and 122 and polarizer 116 and 118 to the left surface of retro prism 110. The device shown in FIG. 3 operates in a similar manner to that shown in FIG. 2 to combine cavity waves of like sense of circular polarization while rejecting waves of the other sense of circular polarization and to transmit the combined waves to detector diodes without a large waste of signal power.

Operation of the device shown in FIG. 3 may be described with reference to Table I of the APPENDIX which indicates the state of polarization for the various waves at selected points within the device. A superscript L as used therein indicates left-hand circular polarization, R indicates righ-hand circular polarization, V indicates vertical linear polarization, and H indicates linear horizontal polarization. As before, the subscript indicates the frequency of the particular wave. Quarter-wave plate 108 is oriented such that right-hand circular polarization and left-hand circular polarization are converted to horizontal and vertical linear polarization respectively, i.e. its fast axis azimuth is +45°. Also, it is to be noted that horizontal and vertical polarizations are converted to right-hand and left-hand circular polarizations respectively upon passing through quarter-wave plate 108 in either direction. It may be seen that all beams below quarter-wave plate 108 are circularly polarized while those above quarter-wave plate 108 are linearly polarized. Since horizontal and vertical polarization are the normal modes for reflection from surfaces having normals lying in the plane of incidence, no crosstalk-inducing depolarization occurs upon reflection from any of the surfaces above quarter-wave plate 108.

The passage of a typical beam may be traced through the device. At point A, which is within laser gyroscope cavity 5, the counterclockwise circulating beam has frequencies $f_2$ and $f_3$ which are left-hand and right-hand circularly polarized respectively. Small portions of these beams are transmitted into mirror substrate 104 through dielectric layers 102. The polarizations of the incident beams are substantially conserved due to the low angle of incidence relative to the normal to dielectric layers 102.

Laser gyroscope cavity 5 is preferably constructed in such a manner that the angle between the incoming beams is 30° or less. By maintaining such a low angle of incidence upon dielectric layers 102, a high degree of maintenance of circular polarization is achieved. For larger angles of incidence, the ellipticity of beams emerging from the rear surface of dielectric layers 102 increases rapidly. With an increase in ellipticity the signal power available at each detector diode is decreased because the polarizers must either be oriented to completely eliminate the undesired components or to pass the maximum amplitude of the desired signals. Because the beams are no longer power orthogonal for elliptical polarization, the polarizers cannot be oriented so as to pass maximum amplitude of the desired signals yet eliminate all of the undesired components. In the former case, crosstalk occurs between the desired output signals while in the latter case a decrease in signal amplitude results.

At point B within mirror substrate 104, the counterclockwise components from the four waves circulating within laser gyroscope cavity are present. These are of frequencies $f_2$ and $f_3$ of left and right-hand circular polarization respectively. Passing through the aperture in beam splitter 106 and through quarter-wave plate 108, these waves are converted to vertical and horizontal polarization respectively. After being reflected from reflecting coatings 114 and 112 upon the upper surfaces of retro prism 110 the same polarizations are maintained but the beam is displaced a lateral distance such that it coincides upon the upper surface of beam splitter 106 at the same position as the beam labeled I containing the components from the clockwise beam of frequencies $f_1$ and $f_4$ of right-hand and left-hand circular polarizations respectively. Transmitted and reflected components are produced from those beams so that both the reflected and transmitted beams from the common point of incidence upon beam splitter 106 contain waves of all four frequencies. Beam J have waves of frequencies $f_1$ and $f_2$ of horizontal polarization and waves of frequencies $f_3$ and $f_4$ of vertical polarization, the latter two having been converted from circular to linear polarization by quarter-wave plate 108. In a similar fashion, beam D contains waves of frequencies $f_1$ and $f_2$ of left-hand circular polarization and waves of frequencies $f_3$ and $f_4$ of right-hand circular polarization. The sense of polarization is reversed upon reflection from the backside of dielectric layers 102. Beam E passes through the aperture in beam splitter 106 and is converted back to linear polarization becoming beam F containing waves of frequencies $f_1$ and $f_2$ with horizontal polarization and waves of frequencies $f_3$ and $f_4$ of vertical polarization.

Beams F and J are reflected by reflecting coating 112 to polarizers 116 and 118. Polarizer 116 is oriented so as to pass only horizontal polarization while polarizer 118 is oriented to pass only vertical polarization. In this manner, waves having frequencies $f_1$ and $f_2$ are coupled to detector 120 and waves of frequencies of $f_3$ and $f_4$ coupled to detector 122.

Heterodyning between the two waves incident upon each detector occurs within the detector producing an output signal in the form of a sinusoid biased by a low frequency or DC component. The frequency of each sinusoid is equal to the frequency difference between the two waves incident upon the particular detector while the magnitude of each DC component, proportional to the average amplitude of the output signal, is in proportion to the sum of the intensities of the two incident waves. Further processing by output processing circuit 32 produces a digital signal indicative of the amount of rotation and an analog signal used for operation of piezoelectric transducer 20 to maintain the appropriate path length within laser gyroscope cavity 5.

It may be seen that with the invention as described in conjunction with FIG. 3, a rugged and compact mechanically rigid structure is provided. In the prior art, each individual optical component was separately mounted upon an individual frame which in turn was secured to an underlying substrate. With the use of the invention, the entire output optic structure is provided in a single rigid unit resulting in a large savings in space. This advantage is extremely important in many applications in which space occupied by any component as well as the total weight is to be minimized.

Figure 4:
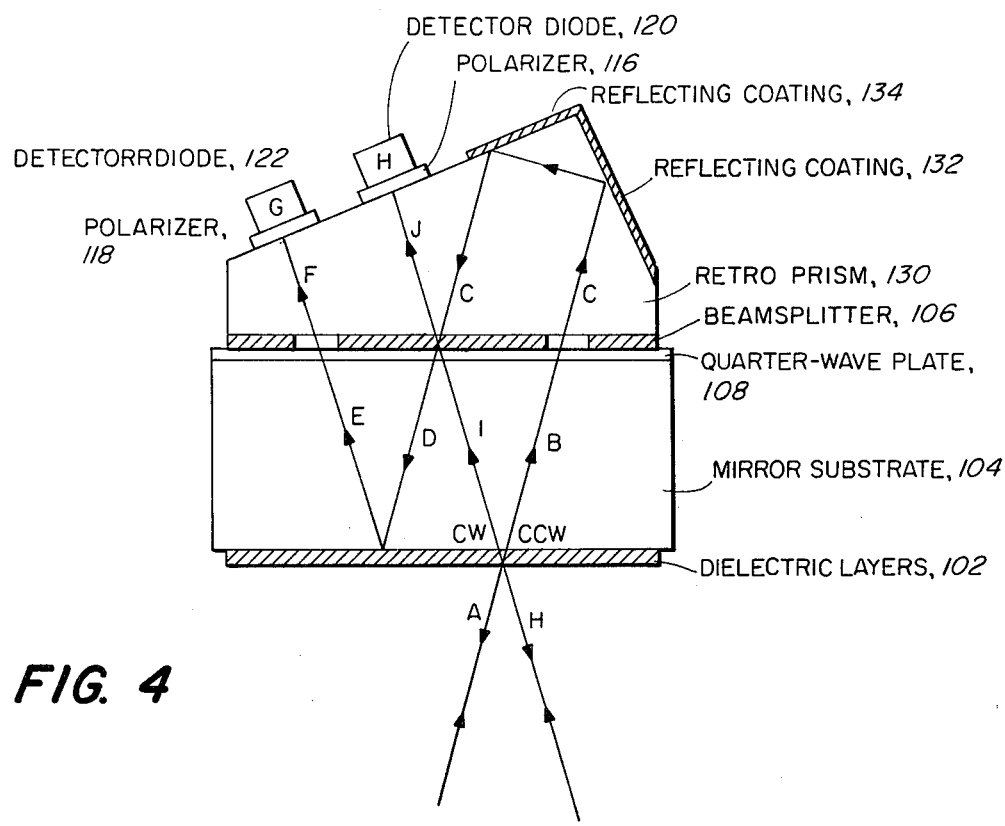
FIG. 4 shows a cross-sectional view of another embodiment of the invention.

Referring next to FIG. 4 there is shown a cross-sectional view of another embodiment of the invention in which a compact and rugged mechanical output optic structure is provided. The embodiment shown in FIG. 4 operates in much the same manner as that shown in FIG. 3 but with the beam splitter and quarter-wave plate reversed in position and a differently shaped prism 130 is employed resulting in different beam paths. Also, polarizers 116 and 118 and detector diodes 120 and 122 are mounted upon the same surface of retro prism 130 of which a portion is covered by reflecting coating 134. The operation for the device shown in FIG. 4 is specified by the entries of Table 2 showing the frequencies and polarization states of the waves present within the device. In this table, polarization state labels + and − signify linear polarization oriented at plus and minus some angle to the horizontal, typically 30 to 45°.

Transmission through multilayer dielectric coatings may alter the polarization state of circular-polarized waves, rendering them elliptical. This effect arises from the differential transmission of electromagnetic waves whose principal plane of vibration of electric field lies in the plane of incidence ("p" polarization) compared to waves vibrating perpendicular to this plane ("s" polarization). The ratio of transmissivities for the two polarizations depends on angle of incidence and may be typically 1.2 to 5. This results in a corresponding ellipticity of the transmitted waves and would give rise to waves having elliptical polarizations rather than linear polarizations. Thus the polarizers cannot block the two undesired waves at each diode. However with quarter-wave plates 136 and 138 in FIG. 4 the polarizations of the undesired waves are rendered linear in each case with polarizers oriented so as to block the undesired polarization. Thus cross-talk may be entirely eliminated. Furthermore, should there by a polarization change upon reflection at the back of mirror 102, this may be compensated simultaneously with the same quarter-wave plate 138. As stated earlier, the desirability of eliminating crosstalk follows from considerations of gyro output noise. The present invention allows elimination of crosstalk even in the presence of different "s" and "p" transmissivities of the output mirror 102 with only a small reduction in signal power. In the embodiments shown in FIGS. 4 and 5 the quarter-wave plate is to be oriented at 0° rather than at 45°. In this case the elliptically polarized waves exiting from mirror 102 are converted by the quarter-wave plate at once to linear polarizations lying in two generally non-ortogonal planes.

Thus, if no further depolarizing elements are encountered by the waves, the cross-talk may be eliminated by use of polarizers 116 and 118 without additional quarter-wave plates.

Figure 5:
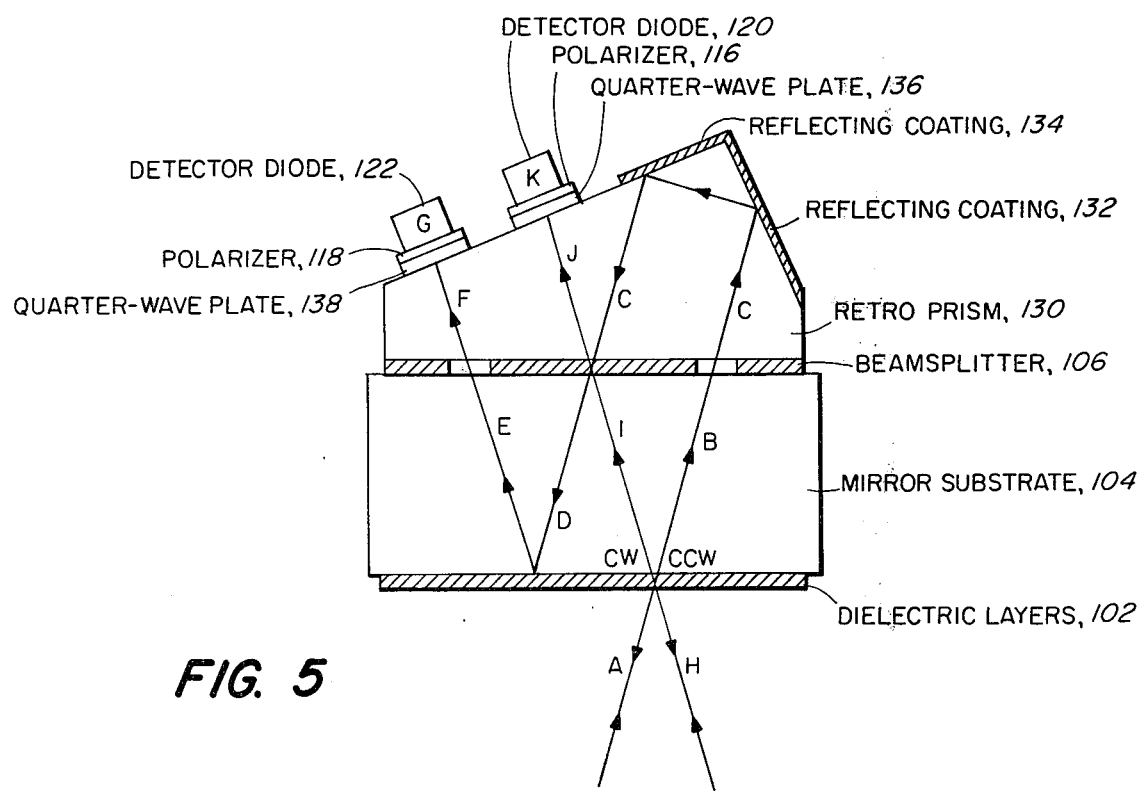
FIG. 5 is a cross-sectional view of still another embodiment of the invention.

Referring further to the device shown in corss-section in FIG. 5, another embodiment of the invention in a mechanically rugged and rigid compact structure is shown. The polarization states of various beams are shown in Table 3 below. A prism shape as used in the device of FIG. 4 is employed in this embodiment. However, no quarter-wave plate is provided adjacent beam splitter 106. However, individual quarter-wave plates 136 nd 138 are provided adjacent polarizers 116 and 118. This embodiment achieves the advantage that the quarter-wave plate for each detector diode may be individually adjusted. This is of use in situations where some degree of depolarization occurs resulting in elliptically polarized waves due to differential phase errors or differential reflectivity or transmissivity from or through the various reflective coatings and dielectric layers, of from a non-ideal quarter-wave plate. Moreover, a quarter-wave plate could be provided adjacent beam splitter 106 in the embodiment of FIG. 5 or, equivalently, individual quarter-wave plates be provided befoe polarizers 116 and 118 of the embodiment of FIG. 4. Double quarter-wave plates have the advantage of eliminating almost any aberration caused by depolarization of the individual beams.

This completes the description of the preferred embodiments of the invention. Although preferred embodiments have been described, it is believed that numerous modifications and alterations thereto would be apparent to one having ordinary skill in the art without departing from the spirit and scope of the invention.

TABLE 1

| | |
|---|---|
| A: $(f_2{}^L f_3{}^R)_{ccw}(f_1{}^L f_4{}^R)_{cw}$ | G: $f_3{}^V f_4{}^V$ |
| B: $f_2{}^L f_3{}^R$ | H: $(f_1{}^R f_4{}^L)_{cw}(f_2{}^R f_3{}^L)_{ccw}$ |
| C: $f_2{}^V f_3{}^H$ | I: $f_1{}^L f_4{}^L$ |
| D: $f_2{}^L f_3{}^R f_1{}^L f_4{}^R$ | J: $f_1{}^H f_4{}^V f_2{}^H f_3{}^V$ |
| E: $f_2{}^R f_3{}^L f_1{}^R f_4{}^L$ | K: $f_1{}^H f_2{}^H$ |
| F: $f_2{}^H f_3{}^V f_1{}^H f_4{}^V$ | |

TABLE 2

| | |
|---|---|
| A: $(f_2{}^L f_3{}^R)_{ccw}(f_1{}^L f_4{}^R)_{cw}$ | G: $f_3{}^+ f_4{}^+$ |
| B: $f_2{}^L f_3{}^R$ | H: $(f_1{}^R f_4{}^L)_{cw}(f_2{}^R f_3{}^L)_{ccw}$ |
| C: $f_2{}^- f_3{}^+$ | I: $f_1{}^R f_4{}^L$ |
| D: $f_1{}^R f_2{}^R f_3{}^L f_4{}^L$ | J: $f_1{}^+ f_2{}^+ f_3{}^- f_4{}^-$ |
| E: $f_1{}^L f_2{}^L f_3{}^R f_4{}^R$ | K: $f_1{}^+ f_2{}^+$ |
| F: $f_1{}^- f_2{}^- f_3{}^+ f_4{}^+$ | |

TABLE 3

| | |
|---|---|
| A: $(f_2{}^L f_3{}^R)_{ccw}(f_1{}^L f_4{}^R)_{cw}$ | G: $f_3{}^H f_4{}^H$ |
| B: $f_2{}^L f_3{}^R$ | H: $(f_1{}^R f_4{}^L)_{cw}(f_2{}^R f_3{}^L)_{ccw}$ |
| C: $f_2{}^L f_3{}^R$ | I: $f_1{}^R f_4{}^L$ |
| D: $f_1{}^L f_4{}^L f_2{}^R f_3{}^R$ | J: $f_1{}^V f_4{}^L f_2{}^V f_3{}^L$ |
| E: $f_1{}^R f_4{}^L f_2{}^R f_3{}^L$ | K: $f_1{}^V f_2{}^V$ |
| F: $f_1{}^R f_4{}^L f_2{}^R f_3{}^L$ | |

What is claimed is:
1. In combination:
   a laser gyroscope cavity having a laser gain medium,
   a polarization dispersive structure for producing waves of at least four frequencies, and a plurality of reflecting means positioned to form a closed path for said waves, at least one of said reflecting means being partially transmitting of waves incident thereon;
   a beam splitter;

means for directing the portions of said waves transmitted through said partially transmitting reflecting means directly through a solid dielectric medium to the plane of said beam splitter, said beam splitter producing reflected and transmitted waves;

means for converting said portions of said waves from circular polarization to linear polarization, said converting means being disposed in the paths of said reflected and transmitted waves from said beam splitter;

polarizing means disposed in the paths of the waves converted to linear polarization; and a plurality of detecting means, with each of said detecting means receiving waves of different frequencies transmitted by said polarizing means.

2. The combination of claim 1 wherein:
said waves are four in number, two of said waves within said cavity being circularly polarized with a first sense of polarization and two of said waves within said cavity being circularly polarized with a second sense of polarization.

3. The combination of claim 2 wherein:
a first one of said waves with said first sense of polarization and a first one of said waves with said second sense of polarization circulate around said path in a first direction and the other one of said waves with said first sense of polarization and the other one of said waves with said second sense of polarization circulate around said path in the direction opposite said first direction.

4. The conbination of claim 3 wherein:
said polarizing means are oriented orthogonal to one another.

5. The combination of claim 3 wherein:
said partially transmitting reflecting means, said beam splitter, said directing means, and said converting means are mechanically coupled as a rigid unit.

6. The combination of claim 5 wherein:
said detecting means and said polarizing means are further mounted as part of said rigid unit.

7. The combination of claim 6 wherein said partially transmitting reflecting means comprises:
a multilayer dielectric mirror.

8. The combination of claim 7 wherein said converting means comprises:
a quarter-wave plate.

9. The combination of claim 7 wherein said directing means comprises:
a retro prism.

10. In combination:
a laser gyroscope cavity having a laser gain medium, a polarization dispersive structure for producing waves of at least four frequencies, and a plurality of reflecting means positioned to form a closed path for said waves:

a transmitting substrate;

a plurality of layers of dielectric material disposed upon a first surface of said substrate, said plurality of layers of dielectric material forming a partially transmitting reflecting mirror, said plurality of layers of dielectric material opposite said substrate forming one of said reflecting means for said waves;

a beam splitter positioned adjacent at least a portion of a second surface of said substrate at a position at which emerges a first beam from said substrate;

a quarter-wave plate, said quarter-wave plate being positioned adjacent at least a portion of said beam splitter;

a prism, a first surface of said prism being adjacent said quarter-wave plate, and said prism having two reflecting surfaces opposite said first surface;

first and second polarizers disposed adjacent a fouth surface of said prism; and first and second detectors positioned adjacent said first and second polarizers;

said beam splitter, said quarter-wave plate, said prism, said first and second polarizers, and said first and second detectos being disposed such that a first beam emerging from said substrate strikes said beam splitter, and a second beam emerging from said substrate passes through said quarter-wave plate, is reflected from both said reflecting surfaces of said prism to said beam splitter, a first transmitted wave and a first reflected wave from said beam splitter pass through said substrate and are reflcted from said pluraliy of layers of dielectric material through said substrate and said quarter-wave plate and are reflected from one of said reflecting surfaces of said prism to said first polarizer and said first detector, and a second transmitted and a second reflected wave from the position on said beam splitter struck by said first beam are reflected from said one of said reflecting surfaces of said prism to said second polarizer and said second detector.

11. The combination of claim 10 wherein:
said plurality of layers of dielectric material, said substrate, said beam splitter, said quarter-wave plate, and said prism are mechanically interconnected to form a rigid structure.

12. The combination of claim 10 further comprising:
second and third quarter-wave plates, said second quarter-wave plate being disposed between said prism and said first polarizer and said third quarter-wave plate being disposed between said prism and said second polarizer.

13. In combination:
a laser gyroscope cavity having a laser gain medium, a polarization dispersive structure for producing waves of at least four frequencies, and a plurality of reflecting means positioned to form a closed path for said waves;

a transmitting substrate;

a plurality of layers of dielectric material disposed upon a first surface of said substrate, said plurality of layers of dielectric material forming a partially transmitting reflecting mirror, said plurality of layers of dielectric material opposite said substrate forming one of said reflecting means for said waves;

a quarter-wave plate positioned adjacent the surface of said substrate opposite that surface upon which said plurality of layers of dielectric material are disposed;

a beam splitter positioned adjacent at least portions of said quarter-wave plate at a position at which emerges a first beam form said quarter-wave plate;

a prism, a first surface of said prism being adjacent said beam splitter, and said prism having second and third surfaces opposite said first surface, at least portions of said second and third surfaces being reflecting; and first and second polarizers disposed upon said second surface of said prism; and first and second detectors positioned adjacent said first and second polarizers;

said quarter-wave plate, said beam splitter, said prism, said first and second polarizers, and said first and second detectors being disposed such that a second beam emerging from said quarter-wave plate is reflected from second and third surfaces of said prism to the same position upon said beam splitter as struck by said first beam, a first transmitted wave and a first reflected wave from said position on said beam splitter pass through said quarter-wave plate and said substrate and are reflected from said plurality of dielectric layers disposed upon said substrate again through said substrate and said quarter-wave plate to said first polarizer and said first detector, and a second transmitted and a second reflected beam from said beam splitter pass through said prism to said second polarizer and said second detector.

14. The combination of claim 13 wherein:
said plurality of layers of dielectric material, said substrate, said beam splitter, said quarter-wave-plate, and said prism are mechanically interconnected to form a rigid structure.

15. The combination of claim 13 further comprising:
second and third quarter-wave plates, said second quarter-wave plate being disposed between said prism and said first polarizer and said third quarter-wave plate being disposed between said prism and said second polarizer.

16. In combination:
a laser gyroscope cavity having a laser gain medium, a polarization dispersive structure for producing waves of at least four frequencies, and a plurality of reflecting means positioned to form a closed path for said path for said waves;
a transmitting substrate;
a plurality of layers of dielectric material disposed upon a first surface of said substrate, said plurality of layers of dielectric material forming a partially transmitting reflecting mirror, said plurality of layers of dielectric material opposite said substrate forming one of said reflecting means for said waves;
a beam splitter positioned adjacent a portion of a second surface of said substrate at a position at which emerges a first beam from said substrate;
a prism, a first surface of said prism being adjacent said beam splitter, and said prism having said first and second surfaces opposite said first surface, said first and second surfaces having at least portions thereof being reflecting;
first and second quarter-wave plates positioned adjacent said second surface of said prism;
first and second polarizers positioned adjacent said first and second quarter-wave plates; and
first and second detectors positioned adjacent said first and second polarizers;
said beam splitter, said prism, said first and second quarter-wave plates, said first and second polarizers, and said first and second detectors being disposed such that a second beam emerging from said substrate is reflected from said reflecting portions of said second and third surfaces of said prism to said beam splitter, a first transmitted wave and a first reflected wave from said beam splitter pass through said substrate and are reflected from said plurality of layers of dielectric material through said substrate and said prism to said first quarter-wave plate, said first polarizer, and said first detector, and a second transmitted and a second reflected wave from said beam splitter pass through said prism to said quarter-wave plate, said second polarizer, and said second detector.

17. The combination of claim 16 wherein:
said plurality of layers of dielectric material, said substrate, said beam splitter, said quarter-wave plate, and said prism are mechanically interconnected to form a rigid structure.

* * * * *